United States Patent

Sugiki et al.

[11] Patent Number: 5,806,890
[45] Date of Patent: Sep. 15, 1998

[54] STEERING WHEEL POSITION ADJUSTING APPARATUS FOR A VEHICULAR STEERING SYSTEM

[75] Inventors: Akio Sugiki, Brussels, Belgium; Mutsumi Miyashiro, Nishikamo-gun, Japan; Hideyasu Miyata, Nagoya, Japan; Toshiyuki Sasaki, Kariya, Japan

[73] Assignee: Aisin Seiki Kabushiki Kaisha, Japan

[21] Appl. No.: 772,658

[22] Filed: Dec. 23, 1996

[30] Foreign Application Priority Data

Dec. 26, 1995 [JP] Japan ................................... 7-339590

[51] Int. Cl.⁶ ..................................................... B62D 1/18
[52] U.S. Cl. ............................................... 280/775; 74/493
[58] Field of Search .................. 280/775; 74/493

[56] References Cited

U.S. PATENT DOCUMENTS 4,934,737  6/1990  Nakasuka ................................. 280/775
5,419,581  5/1995  Schafer et al. ......................... 280/775

FOREIGN PATENT DOCUMENTS

Hei 4-86577  7/1992  Japan .

Primary Examiner—Daniel D. Wasil
Attorney, Agent, or Firm—Finnegan, Henderson, Farabow, Garrett, & Dunner, L.L.P.

[57] ABSTRACT

A steering wheel position adjusting apparatus including a fixed tubular column, a movable tubular column movably mounted on the fixed tubular column, a lower rotational output steering shaft mounted within the fixed tubular column, and an upper rotational input steering shaft mounted within the movable tubular column and having upper and lower ends. The upper rotational steering shaft is connected at the upper end thereof to the manually operated steering wheel, and is connected at the lower end thereof to an upper end of the lower rotational steering shaft. The upper rotational steering shaft is movable with respect to the lower rotational steering shaft. An annular shaped ultrasonic motor is mounted on the outer periphery of the fixed column, the annular shaped ultrasonic motor being coaxial with the fixed tubular column and includes an output gear. A movable tubular column position adjusting device is provided for moving the movable tubular column relative to the fixed tubular column by actuation of the annular shaped ultrasonic motor. The movable column position adjusting device includes input gear engaged with the output gear of the annular shaped ultrasonic motor, an output connected to the movable tubular column and an arrangement operatively connecting the input gear and the output.

10 Claims, 5 Drawing Sheets

STEERING WHEEL POSITION ADJUSTING APPARATUS FOR A VEHICULAR STEERING SYSTEM

BACKGROUND OF THE INVENTION

1. Field of the Invention

The present invention relates to a steering wheel position adjusting apparatus for a vehicular steering system including a manually operated steering wheel, and, more particularly, to a steering wheel position adjusting apparatus in which the position of the steering wheel is adjustable axially in a longitudinal direction and/or in a vertical tilting direction by operation of an annular motor, such as an ultrasonic motor, which is coaxial with a tubular column for accommodating a steering shaft to be connected at an upper end to the steering wheel and at a lower end thereof to the road wheel steering mechanism.

2. Description of the Related Art

Japanese Utility model application laid-open No. Hei 4-86577 discloses a steering wheel position adjusting apparatus for a vehicular steering system in which a steering wheel position is adjustable in longitudinal direction of a vehicle and in a vertical tilting direction. The apparatus includes a fixed tubular column mounted in a vehicle body with a predetermined slant angle, a movable tubular column surrounding an upper end portion of the fixed tubular column and mounted for axial movement on the fixed tubular column, a lower rotational steering shaft mounted within the fixed tubular column and connected to a road wheel steering mechanism, an upper rotational steering shaft mounted within the movable tubular column and connected at an upper end to the steering wheel, and at a lower end thereof to the upper end of the lower steering shaft, and an annular shaped ultrasonic motor of traveling wave type mounted on an upper end of the fixed tubular column and accommodated within the movable tubular column. The motor is coaxial with the tubular columns and includes an annular stator fixed to the fixed tubular column and an annular rotor supported by the fixed tubular column, which is provided on the outer periphery thereof with a male screw in engagement with a female screw provided on the inner periphery of the movable tubular column, so that the position of the steering wheel in the longitudinal direction of the vehicle and the vertical direction is adjusted through the axial movement of movable tubular column in response to the actuation of the motor.

The ultrasonic motor has an advantage in that the actuation noise level is lower than that of a direct current motor having an output torque the same as the output torque of the ultrasonic motor. However, the ultrasonic motor has a disadvantage in that the diameter of the ultrasonic motor is larger than that of the direct current motor. In the above-mentioned steering wheel position adjusting apparatus, the ultrasonic motor accommodated within the movable tubular column increases the diameter of the movable tubular column so that it is difficult to obtain enough space to accommodate the legs of a vehicle operator.

In the above-mentioned steering wheel position adjusting apparatus, the output torque of the motor must be increased because a large friction resistance is generated between male and female screws of large diameter during operation of the motor, thereby increasing cost and size of the apparatus.

Thus, there is a need for a steering wheel position apparatus that is capable of attaining low levels of actuation noise, reduced cost and and reduction in size.

SUMMARY OF THE INVENTION

Accordingly, it is an object of the present invention to provide a steering wheel position adjusting apparatus that will satisfy the above-mentioned needs.

Other objects, the advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the steering wheel position adjusting apparatus of the invention comprises a fixed tubular column, a movable tubular column movably mounted on the fixed tubular column, a lower rotational output steering shaft mounted within the fixed tubular column, and an upper rotational input steering shaft mounted within the movable tubular column and having upper and lower ends. The upper rotational steering shaft is connected at the upper end thereof to the manually operated steering wheel, and is connected at the lower end thereof to an upper end of the lower rotational steering shaft. The upper rotational steering shaft is movable with respect to the lower rotational steering shaft. An annular shaped ultrasonic motor means is mounted on the outer periphery of the fixed column, the annular shaped ultrasonic motor means being coaxial with the fixed tubular column and includes output gear means. Movable tubular column position adjusting means is provided for moving the movable tubular column relative to the fixed tubular column by actuation of the annular shaped ultrasonic motor means. The movable column position adjusting means includes input gear means engaged with the output gear means of the annular shaped ultrasonic motor means, output means connected to the movable tubular column and connecting means operatively connecting the input gear means and the output means.

It is to be understood that both the foregoing general description and the following detailed description are exemplary and explanatory only and are not restrictive of the invention, as claimed.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
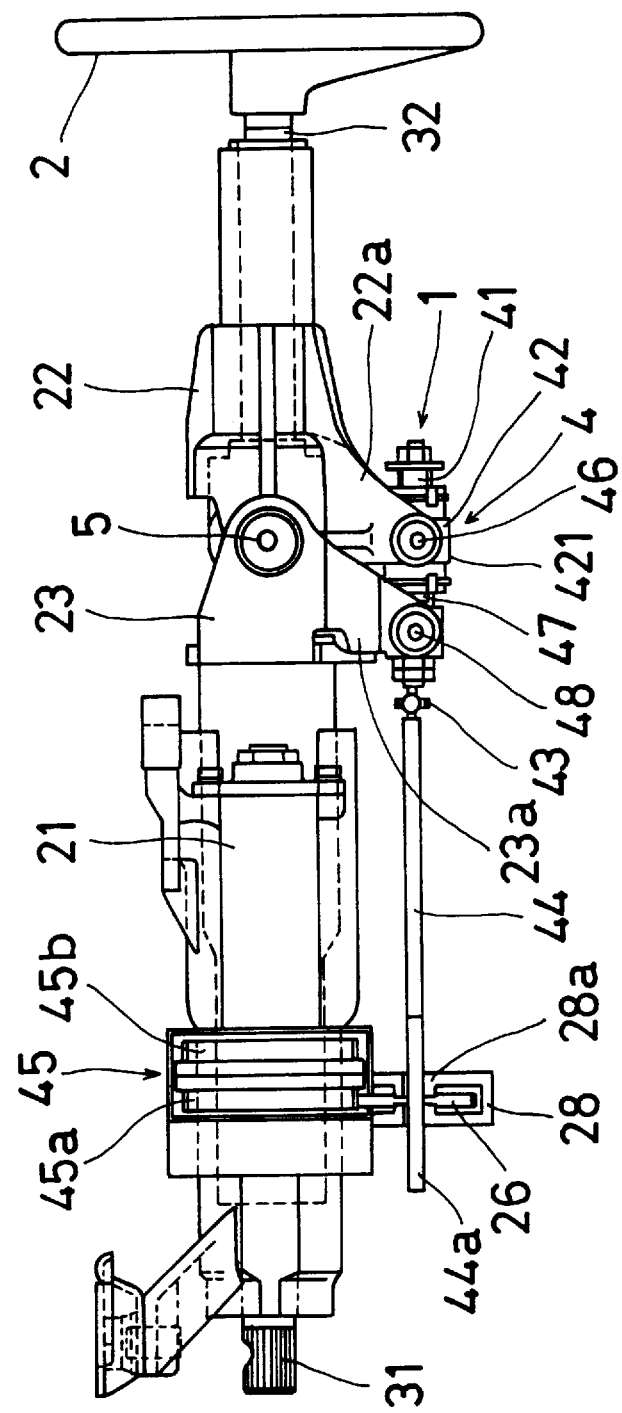
FIG. 1 is a partial side view of an embodiment of the steering wheel position adjusting apparatus according to the present invention.
Figure 2:
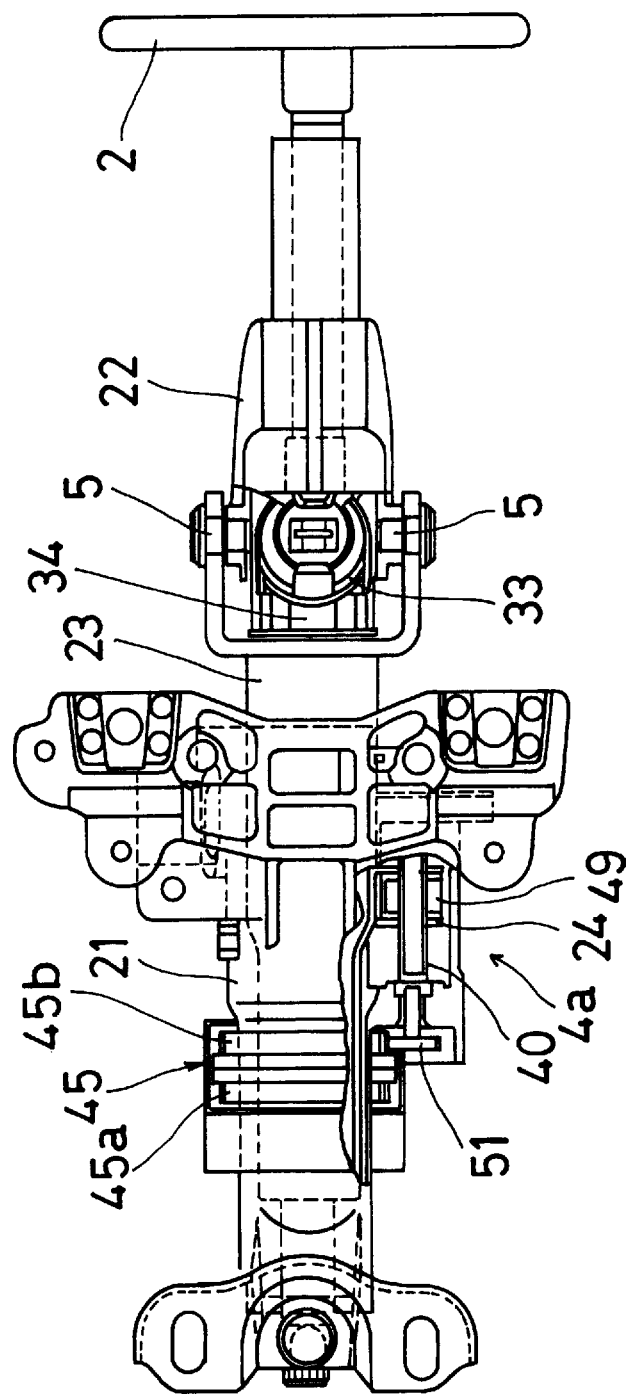
FIG. 2 is a partial top view of the embodiment.
Figure 3:
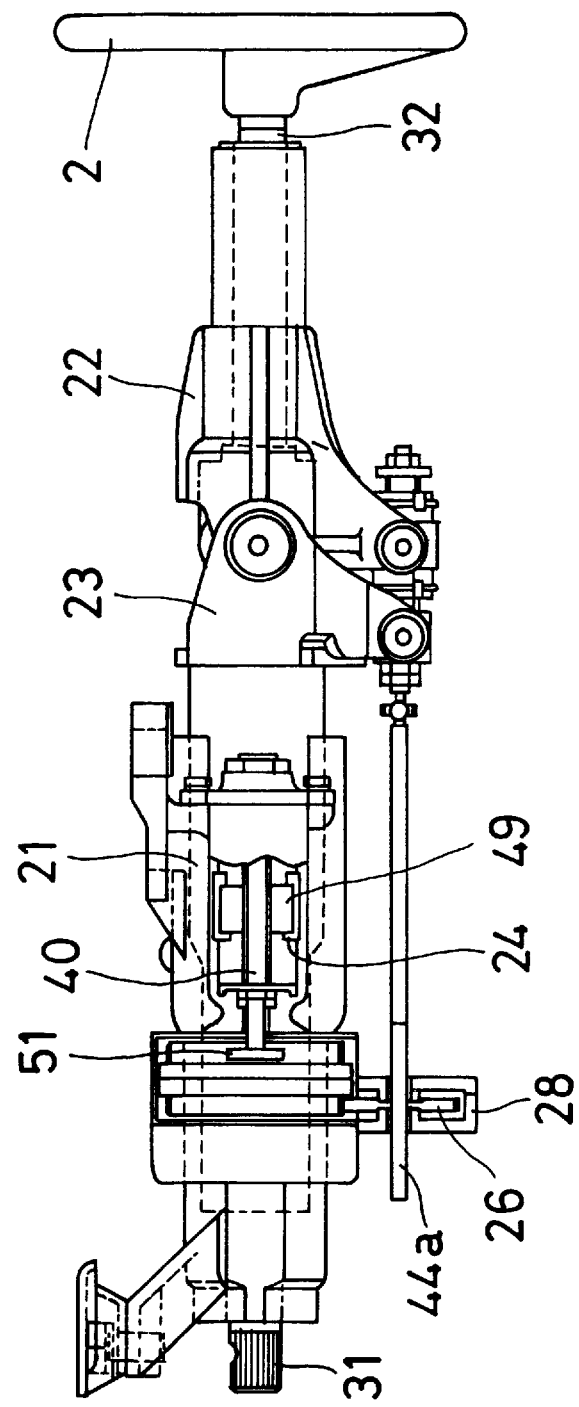
FIG. 3 is another partial side view of the embodiment.

In FIGS. 1 to 5, there is shown an embodiment of a steering wheel position adjusting apparatus for vehicular steering system that includes a manually operated steering wheel 2 and a road wheel steering mechanism (not shown)

to be actuated by the steering wheel 2. The steering wheel position adjusting apparatus 1 includes a fixed lower tubular column 21 adapted to be mounted in a vehicular body (not shown) at a predetermined angle of inclination, a first or upper movable tubular column 22 and a second or intermediate movable tubular column 23 as shown in FIGS. 1 to 3. The second movable tubular column 23 is movably mounted on the fixed tubular column 21 so that the second movable tubular column 23 is axially movable and so that rotation of the second movable tubular column 23 on the fixed tubular column 21 is restricted. The first movable tubular column 22 is mounted on the fixed tubular column 21 through the second movable tubular column 23 so that an upper end of the second movable tubular column 23 is connected to a lower end of the first movable tubular column 22 by a pair of horizontal shafts 5,5 which provide a first horizontal axis for tilting movement of the first movable tubular column 22 as shown in FIGS. 1 and 2.

As shown in FIGS. 1 to 3, a lower rotational steering shaft 31, to be connected operatively to the road wheel steering mechanism, is mounted within the fixed tubular column 21 so that axial movement of the lower rotational steering shaft 31 is restricted. An upper rotational steering shaft 32 is mounted within the first movable tubular column 22 so that axial movement of the upper rotational steering shaft 32 relative to the first movable tubular column 22 is restricted. The upper rotational steering shaft 22 is connected at an upper end thereof to the steering wheel 2 and connected at a lower end thereof through a universal joint 33 to an upper end of an intermediate rotational steering shaft 34 (FIG. 2), which is mounted within the second movable tubular column 23 and connected to the lower rotational steering shaft 31. Axial movement of the intermediate rotational steering shaft 34 relative to the second movable tubular column 23 is restricted but the intermediate rotational steering shaft 34 is axially movable relative to the lower rotational steering shaft 31. Thus the steering wheel 2 is operatively connected to the road wheel steering mechanism (not shown) through the steering shafts 31, 32 and 34.

Figure 5:
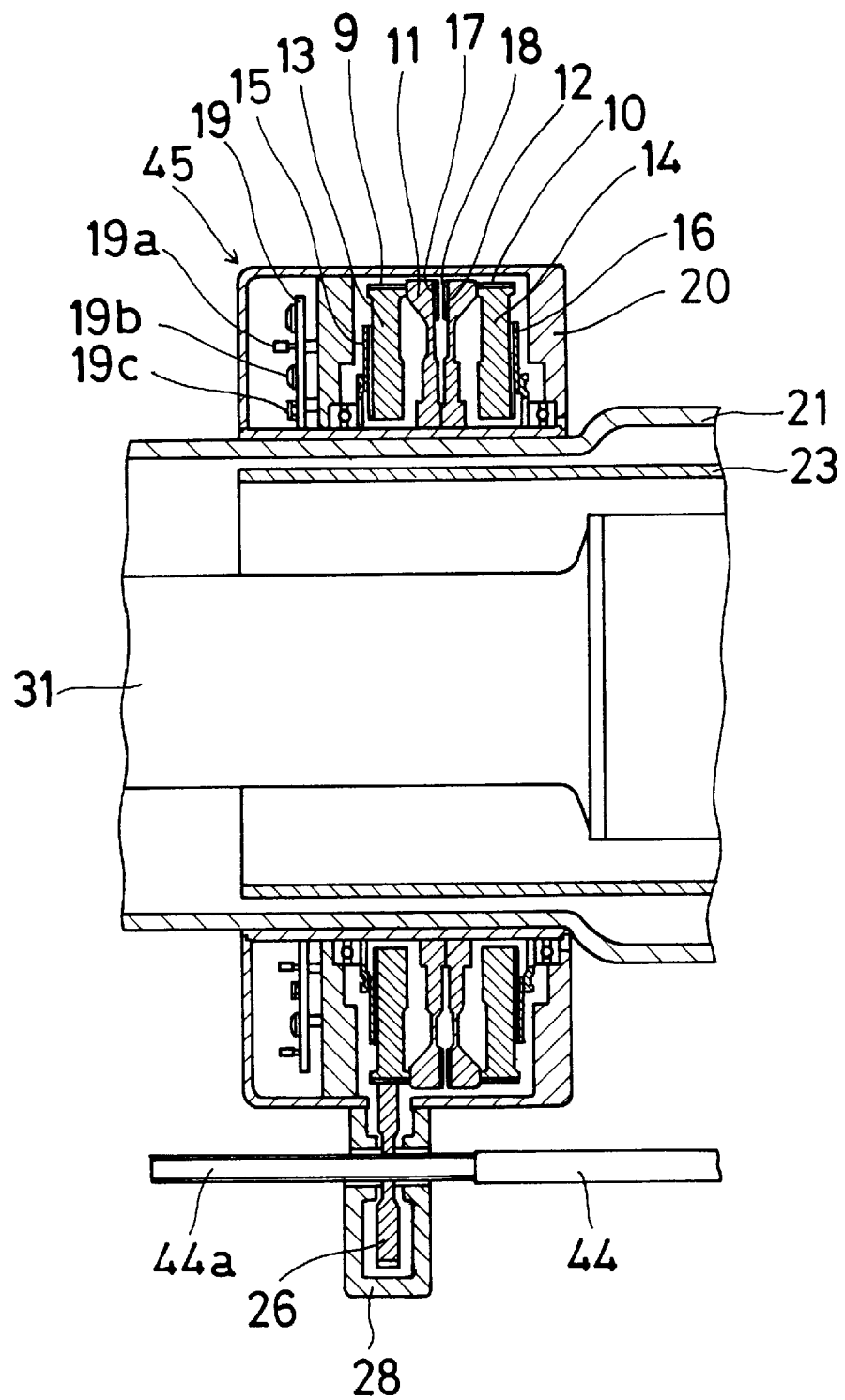
FIG. 5 is an enlarged fragmentary sectional view illustrating ultrasonic motors of the embodiment.

As shown in FIGS. 1 to 3, an annular shaped ultrasonic motor unit 45 is mounted on the outer periphery of the fixed tubular column 21. The motor unit 45 includes first and second annular ultrasonic motors 45a and 45b which are of a traveling wave type and which are adjacent to each other. As shown in FIG. 5, the motor unit 45 includes an annular shaped motor case 20 fixedly mounted on the outer periphery of the fixed tubular column 21, the motor case 20 accommodates therein first and second annular stators 11 and 12, first and second annular rotors 13 and 14, first and second annular springs 15 and 16, and an electric circuit board 19 with circuit components 19a, 19b and 19c for controlling actuation of the motors 45a and 45b. The motor 45a includes the first stator 11, the rotor 13 and the spring 15. The motor 45b includes the stator 12, the rotor 14 and the spring 16. The first and second stators 11 and 12 are provided with first and second piezoelectric element arrangements 17 and 18. The spring 15 urges the rotor 13 toward the stator 11 and the spring 16 urges the rotor 14 toward the stator 12. The actuation of the motor 45a for forward rotation and reverse rotation thereof and the actuation of the motor 45b for forward rotation and reverse rotation thereof may be electrically controlled through the elected circuit board 19 independently.

Figure 4:
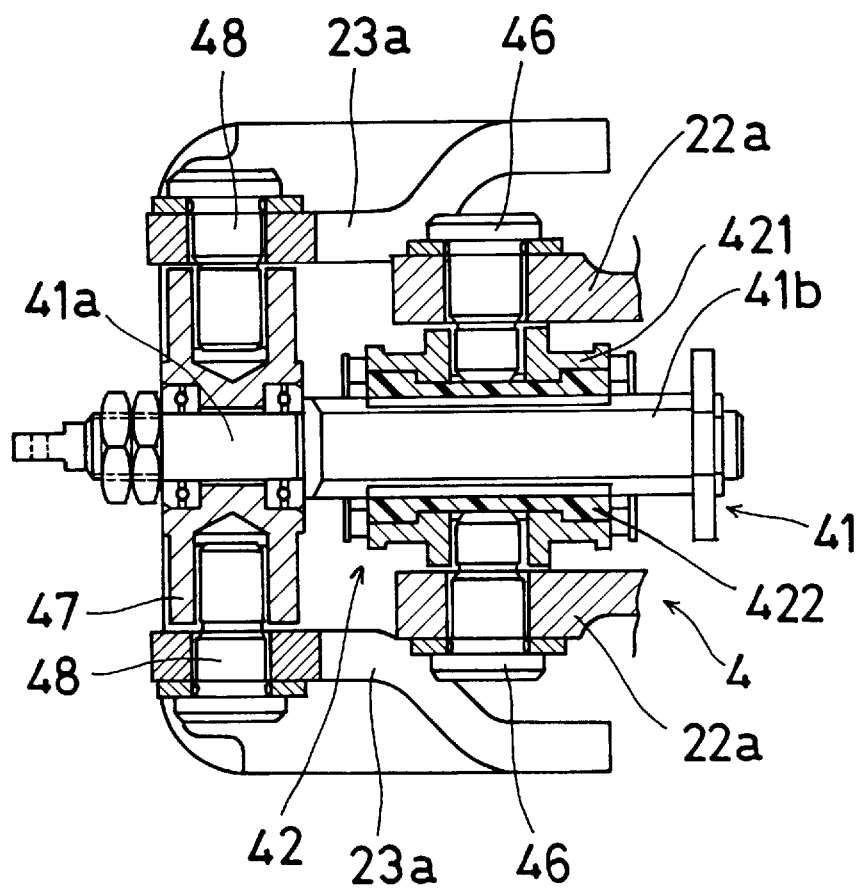
FIG. 4 is an enlarged fragmentary sectional view of a part of the embodiment.

The rotors 13 and 14 are provided with output gears 9 and 10 on their outer peripheries, respectively. The output gear 9 is engaged with an input gear 26, of a first adjusting arrangement 4 for tilting the first movable tubular column 22, accommodated within a gear case 28 fixed to the motor case 20 as shown FIGS. 1 and 5. As shown in FIGS. 1 and 4, the first adjusting arrangement 4 includes a first screw nut assembly 42 which has a resin screw nut 422 molded within a metallic sleeve 421 and fixed to the sleeve 421. The screw nut assembly 42 is positioned between a pair of arms 22a, 22a provided on the first movable tubular column 22 and supported on the arms 22a, 22a by a pair of horizontal shafts 46, 46 which provide a second horizontal axis about which the screw nut assembly 42 is movable. The first adjusting arrangement 4 further includes a first screw shaft 41 and a connecting shaft 44. The first screw shaft 41 is engaged with the screw nut assembly 42 at threaded portion 41b thereof and mounted on the second movable tubular column through a support member 47 which is positioned between a pair of supporting arms 23a, 23a provided on the second movable tubular column 23 and supported by a pair of horizontal shafts 48, 48. The shafts 48, 48 provide a third horizontal axis about which the screw shaft 41 is movable. The screw shaft 41 is supported at non-threaded portion 41a thereof by the support member 47. As shown in FIG. 1, the connecting shaft 44 is connected at one end thereof through a joint 43 to one end of the screw shaft 41 and keyed for axial movement at the other splined end 44a thereof to a input gear 26.

As shown in FIGS. 2 and 3, a second adjusting arrangement 4a for axially moving the second movable tubular column 23 and an accompanying axial movement of the first movable tubular column 22, includes an input gear 51 engaged with the output gear 10 of the motor 45b, a second screw nut 49 fixed to a fixed support member 24 provided on the second movable tubular column 23, a second screw shaft 40 which is supported by the fixed support member 24, the screw shaft 40 being engaged with the screw nut 49 and connected to the input gear 51.

In the operation of the apparatus 1, when the motor 45a is energized for forward rotation, the rotor 13 of the motor 45a rotates in a forward direction, which forward rotation is transmitted to the first screw shaft 41 through the input gear 26, connecting shaft 44 and joint 43. The forward rotation of the screw shaft 41 causes upward movement of the screw nut assembly 42 so that the first movable tubular column 22 is moved about the first horizontal axis (shaft 5) in a counter clockwise direction, as viewed in FIG. 1, thereby tilting the position of the steering wheel 2 upwardly. The tilting movement of the steering wheel position is stopped when the motor 45a is de-energized and the tilted steering wheel position is maintained by engagement of the screw shaft 41 with the screw nut assembly 42.

When the motor 45a is energized for reverse rotation, the rotor 13 of the motor 45a rotates in a reverse direction, the screw shaft 41 rotates in a reverse direction to move the screw nut assembly 42 downward so that the first movable tubular column 22 is moved about the first horizontal axis in a clockwise direction in FIG. 1, thereby tilting the position of the steering wheel 2 downwardly.

An alignment between the screw shaft 41 and the connecting shaft 44 is compensated by movement of the screw nut assembly 42 about the second horizontal axis (shaft 46), movement of the support member 47 about the third horizontal axis (shaft 48) and axial movement of the connecting shaft 44.

When the motor 45b is energized for forward rotation, the rotor 14 of the motor 45b rotates in a forward direction, which forward rotation is transmitted to the second screw shaft 40 through the input gear 51. The forward rotation of the screw shaft 41 causes upward movement of the screw nut 49 so that the second movable tubular column 23 is axially moved to the right in FIG. 1 and is accompanied by axial movement of the first movable tubular column 22, thereby shifting the axial position of the steering wheel 2 toward the rear of the vehicle. The axial shifting of steering wheel position is stopped when the motor 45b is de-energized and the shifted steering wheel position is maintained by engagement of the screw shaft 40 with the screw nut 49.

When the motor 45b is energized for reverse rotation, the rotor 14 of the motor 45b rotates in a reverse direction, the screw shaft 40 rotates in a reverse direction to move the screw nut 49 downward so that the second movable tubular column 23 is axially moved downward, or to the left in FIG. 1, and is accompanied by axial movement of the first movable tubular column 22, thereby shifting the position of the steering wheel 2 forwardly of the vehicle.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A steering wheel position adjusting apparatus for vehicular steering system including a manually operated steering wheel comprising;
    a fixed tubular column;
    a movable tubular column movably mounted on the fixed tubular column;
    a lower rotational output steering shaft mounted within the fixed tubular column;
    an upper rotational input steering shaft mounted within the movable tubular column and having upper and lower ends, the upper end of the upper rotational steering shaft being connected to the manually operated steering wheel and the lower end thereof being connected to an upper end of the lower rotational steering shaft, the upper rotational steering shaft being movable with respect to the lower rotational steering shaft;
    annular shaped ultrasonic motor means mounted on an outer periphery of the fixed column, the annular motor being coaxial with the fixed tubular column and including output gear means; and
    movable tubular column position adjusting means for moving the movable tubular column relative to the fixed tubular column by actuation of the annular shaped ultrasonic motor means; the movable column position adjusting means including input gear means engaged with the output gear means of the annular shaped motor means, output means connected to the movable tubular column and connecting means operatively connecting the input gear means and the output means.

2. A steering wheel position adjusting apparatus according to claim 1, wherein the movable tubular column is movable about a horizontal axis positioned at a lower end thereof.

3. A steering wheel position adjusting apparatus according to claim 1, wherein the movable tubular column is axially movable relative to the fixed tubular column.

4. A steering wheel position adjusting apparatus according to claim 2, wherein the output means of the movable tubular column position adjusting means includes a screw nut connected to the movable tubular column, and the connecting means of the movable tubular column position adjusting means includes a rotational screw shaft mounted on the fixed tubular column, the rotational screw shaft being connected rotatably to the input gear means and engaged with the screw nut.

5. A steering wheel position adjusting apparatus according to claim 3, wherein the output means of the movable tubular column position adjusting means includes a screw nut connected to the movable tubular column, and the connecting means of the movable tubular column position adjusting means includes a rotational screw shaft mounted on the fixed tubular column, the rotational screw shaft being connected in parallel to the input gear means in rotation and engaged with the screw nut.

6. A steering wheel position adjusting apparatus according to claim 1, wherein the apparatus further includes an annular shaped motor case which accommodates the annular shaped motor means and electric circuit for controlling operation of the annular shaped motor means.

7. A steering wheel position adjusting apparatus according to claim 1, wherein the movable tubular column is a first movable tubular column mounted on the fixed tubular column through a second movable tubular column mounted for axial movement on the fixed tubular column and connected at an upper end thereof to a lower end of the first movable tubular column at a first horizontal axis, the first movable tubular column being movable about the first horizontal axis, the upper rotational steering shaft is connected through an intermediate rotational steering shaft connected at lower end thereof for relative axial movement to the upper end of the lower steering shaft and connected at an upper end thereof to the lower end of the upper rotational steering shaft by a universal joint, the annular shaped ultrasonic motor means includes a first annular shaped motor means having a first output gear means and a second annular shaped ultrasonic motor means having a second output gear means, and the movable tubular column position adjusting means includes a first input gear means engaged with the first output gear means of the first annular shaped ultrasonic motor means, a first output means connected to the first movable tubular column, a first connecting means operatively connecting the first input gear means and the first output means, a second input gear means engaged with the second output gear means of the second annular shaped ultrasonic motor means, a second output means connected to the second movable tubular column and a second connecting means operatively connecting the second input gear means and the second output means.

8. A steering wheel position adjusting apparatus according to claim 7, wherein the first and second annular shaped ultrasonic motor means are adjacent to each other on the outer periphery of the fixed tubular column.

9. A steering wheel position adjusting apparatus according to claim 7, wherein the first output means includes a first screw nut connected to the first movable tubular column, the first connecting means includes a first rotational screw shaft mounted on the second movable tubular column and engaged with the first screw nut and a first connecting shaft connecting the first rotational screw to the first input gear means, the second output means includes a second screw nut connected to the second input gear means and engaged with the second screw nut, and the first and second annular shaped motor means include first and second annular shaped ultrasonic motors respectively.

10. A steering wheel position adjusting apparatus according to claim 9, wherein the first screw nut is movable on the first movable tubular column about a second horizontal axis, the first rotational screw shaft is movable on the second movable tubular column about a third horizontal axis, and the first connecting shaft is axially movable relative to the first input gear.

* * * * *